April 15, 1958
W. WEESE
2,830,796
MINING DRILL BIT
Filed Nov. 30, 1956
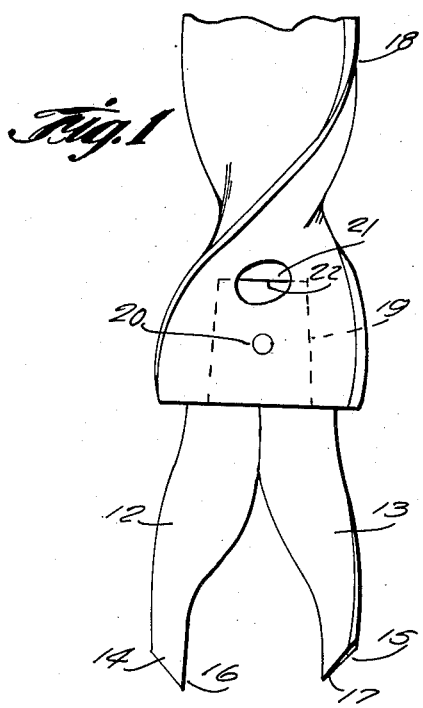
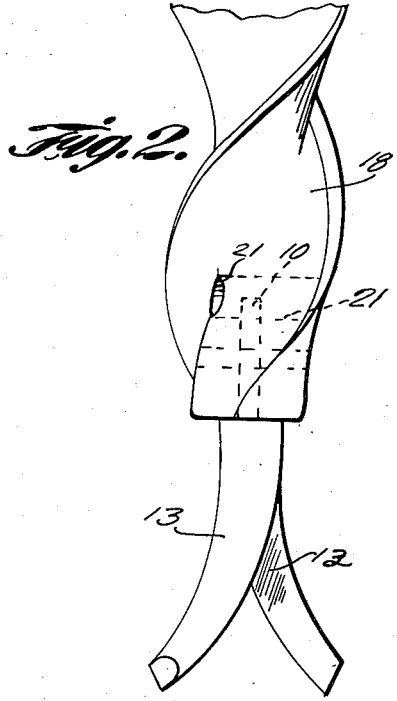
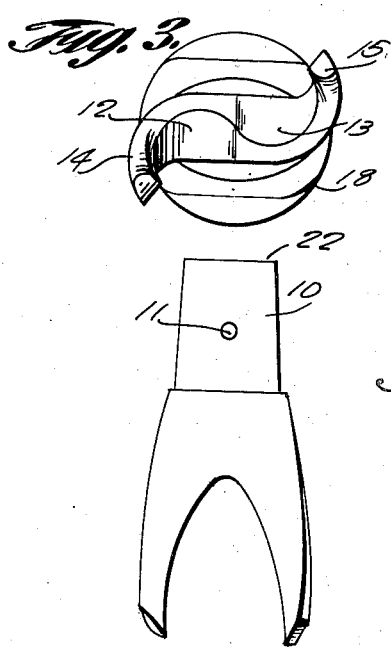
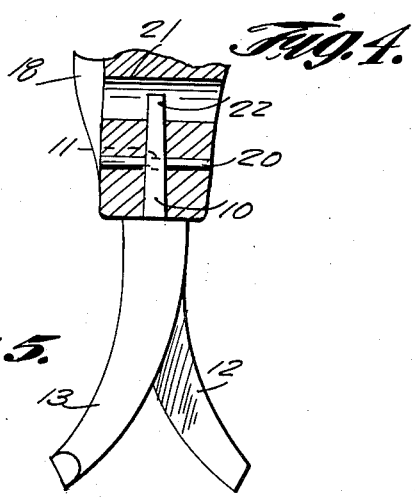
INVENTOR.
Wesley Weese
BY Victor J. Evans & Co.
ATTORNEYS

United States Patent Office 2,830,796
Patented Apr. 15, 1958

2,830,796

MINING DRILL BIT

Wesley Weese, Sanderson, W. Va.

Application November 30, 1956, Serial No. 625,468

1 Claim. (Cl. 255—61)

This invention relates to drills and drill bits used primarily for core breaking in coal mining, and in particular a mining drill bit having a shank formed to be inserted in a socket in the end of a drill or auger with cutting edges provided on arcuate and twisted arms extended from the shank whereby the arms, which are readily replaceable cut into the material and take the wear.

The purpose of this invention is to provide a drill bit that is adapted to be installed in a comparatively few minutes and that obviates the necessity of holding up the drilling operation as drill tips are sent to shops for reconditioning.

With conventional types of drills used in hand and electric drilling the tips of the drills wear and it is necessary to send the drill or auger to a shop where it is reconditioned and returned for reuse. In this procedure considerable valuable time is lost and the reconditioning is relatively costly. With this thought in mind this invention contemplates a drill tip removably mounted in the end of the body of a drill with spirally disposed arms extended from the shank and designed to provide speed cutting edges.

The object of this invention is, therefore, to provide an improved drill tip particularly adapted for coal mining in which the tip is readily replaceable.

Another object of the invention is to provide a replaceable drill tip wherein the length of a drill or auger remains constant and is not gradually reduced.

Another important object of the invention is to provide a replaceable drill tip in which the cost of the tip is relatively negligible.

A further object of the invention is to provide a drill tip including a pair of twisted arcuate arms having sharp cutting edges extended from a shank and formed to be installed in the end of a drill in which the improved drill tip is of a simple and economical construction.

With these and other objects and advantages in view the invention embodies a drill tip having a shank with spirally disposed arms extended therefrom and in which the shank of the improved drill tip is formed to be installed in a socket in the end of a drill and secured in the socket with a pin.

Other features and advantages of the invention will appear from the following description taken in connection with the drawing, wherein:

Figure 1 is a front elevational view of the improved mining drill tip.

Figure 2 is a side elevational view of the drill tip shown in Fig. 1.

Figure 3 is a view looking upwardly toward the lower end of the improved drill tip.

Figure 4 is a vertical section through the improved drill tip showing the shank of the tip secured by a pin in a socket in the end of a drill.

Figure 5 is a view showing the improved drill tip with parts of the drill in which the tip is mounted omitted.

Referring now to the drawing wherein like reference characters denote corresponding parts the improved drill bit of this invention includes a tapering tongue or shank 10 having an opening 11 therethrough and spirally disposed arms 12 and 13 having sharp cutting edges 14 and 15 extending from points 16 and 17, and the device is installed on the end of a drill shank 18 with the shank or tongue 10 positioned in a tapering socket 19 extended into the end of the drill and secured in position by a pin 20 extended through the wall of the drill and also through the opening 11 in the shank 10.

The cross sectional area of the tongue is less than that of the base portions of the arms whereby a shoulder is provided at the intersection of the arms and tongue and with the parts assembled with the tongue in the socket the shoulder bears against the end surface of the drill shank.

The drill tips, which are comparatively inexpensive, are readily mounted on ends of drills by placing the shanks 10 in the sockets 19 and the bits are secured in position with the pins 20; and when it is desired to remove a bit a tool is inserted in an opening 21 which extends inwardly as indicated by the dotted lines in Fig. 2 and by driving a wedge-shaped end of a tool in the space above the upper end 22 of the shank 10 the bit is forced from the socket.

The improved drill bit is formed to be used with both hand and electric drills.

The improved coal mining drill bit increases the speed of cutting in coal mines. The sharp cutting edges chip the coal while drilling and the spiral arms prevent the drill being caught or stuck in the coal.

It will be understood that modifications, within the scope of the appended claim, may be made in the design and arrangement of the parts without departing from the spirit of the invention.

What is claimed is:

In a drill, the combination which comprises a spiral drill shank having a transversely disposed end surface and having a tapering socket extended inwardly from the end surface and positioned on the axis of the drill shank, the socket being substantially rectangular-shape in cross section, a bit including a pair of spirally disposed arms curving outwardly in opposite directions and having sharp cutting edges on extended ends, said arms having arcuate inner surfaces blending into an integral base portion and said base portion having a tongue, rectangular-shape in cross section extended from the end surface thereof, the tongue being tapered to correspond with the taper of the socket in the end of the drill shank, the cross sectional area of the base portions of the arms being greater than that of the tongue providing a shoulder at the intersection of the base portions and tongue and said shoulder being positioned to seat against the end surface of the drill shank with the tongue in the socket thereof whereby the load resulting from cutting operations of the arms is taken by the end surface of the drill shank, and a pin extended through the drill shank and tongue for retaining the arms in operative positions on the end of the drill shank.

References Cited in the file of this patent

UNITED STATES PATENTS

| | | |
|---|---|---|
| 566,527 | Olds | Aug. 25, 1896 |
| 1,401,353 | Murray | Dec. 27, 1921 |
| 2,341,237 | Phipps | Feb. 8, 1944 |
| 2,372,612 | Stogsdill | Mar. 27, 1945 |